United States Patent [19]

Uehara

[11] Patent Number: 4,802,041
[45] Date of Patent: Jan. 31, 1989

[54] LOADING DEVICE FOR A CASSETTE HAVING A COVER MEMBER

[75] Inventor: Tsukasa Uehara, Tokyo, Japan
[73] Assignee: Canon Kabushiki Kaisha
[21] Appl. No.: 157,088
[22] Filed: Feb. 9, 1988

Related U.S. Application Data

[63] Continuation of Ser. No. 727,583, Apr. 26, 1985, abandoned.

[30] Foreign Application Priority Data

Apr. 28, 1984 [JP] Japan .................................. 59-86887

[51] Int. Cl.⁴ ...................... G11B 5/09; G11B 17/028; G11B 17/032
[52] U.S. Cl. .............................. 360/99.06; 360/99.02; 369/77.2
[58] Field of Search ...................... 360/97, 99, 85, 96.5

[56] References Cited

U.S. PATENT DOCUMENTS

| | | | |
|---|---|---|---|
| 4,433,405 | 2/1984 | Saito et al. | 369/77.2 |
| 4,488,190 | 12/1984 | Oishi et al. | 360/133 X |
| 4,511,944 | 4/1985 | Saito | 360/97 X |
| 4,570,195 | 2/1986 | Shimaoka et al. | 360/97 |
| 4,583,140 | 12/1983 | Shimaoka et al. | 360/97 |
| 4,716,477 | 12/1987 | Uehara | 360/97 |
| 4,723,185 | 2/1988 | Maeda | 360/97 |

FOREIGN PATENT DOCUMENTS 56-80846 7/1981 Japan.

*Primary Examiner*—Stuart N. Hecker
*Assistant Examiner*—Alyssa H. Bowler
*Attorney, Agent, or Firm*—Toren, McGeady & Associates

[57] ABSTRACT

In a cassette loading device in an apparatus for use with a record bearing medium housed in the cassette which is provided with at least one window for exposing a portion of the medium and a movable cover member for the window, when the cassette is moved between a first position to receive and hold the cassette and a second position to place the cassette at a predetermined loading position, an opening and closing device is made to engage with the movable cover member thereby effecting the opening and closing of the window of the cassette corresponding to an action to insert the cassette or take out the same and, at the same time, the engagement between the opening and closing device and the movable cover member is controlled between the first position and the second position.

23 Claims, 11 Drawing Sheets

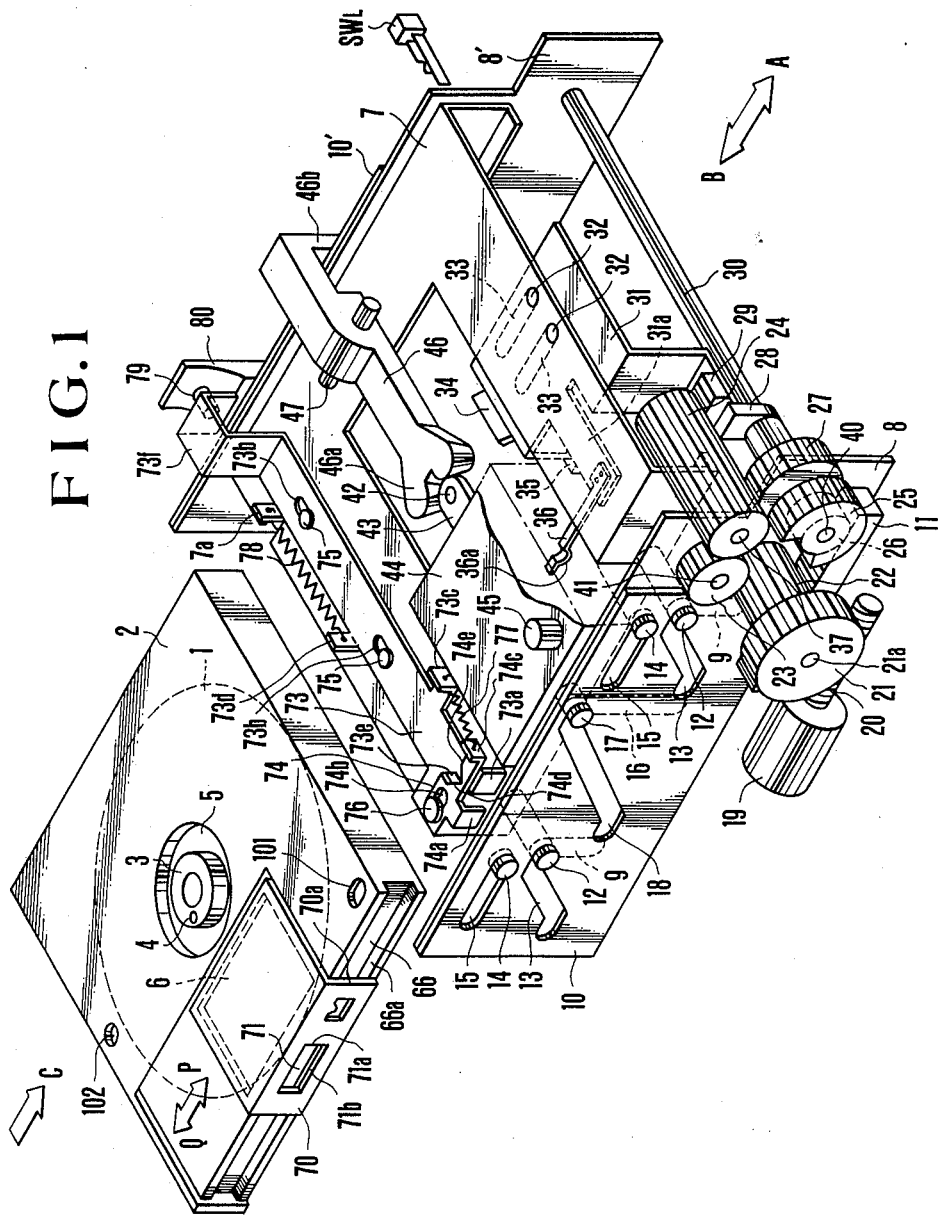
F I G. 1

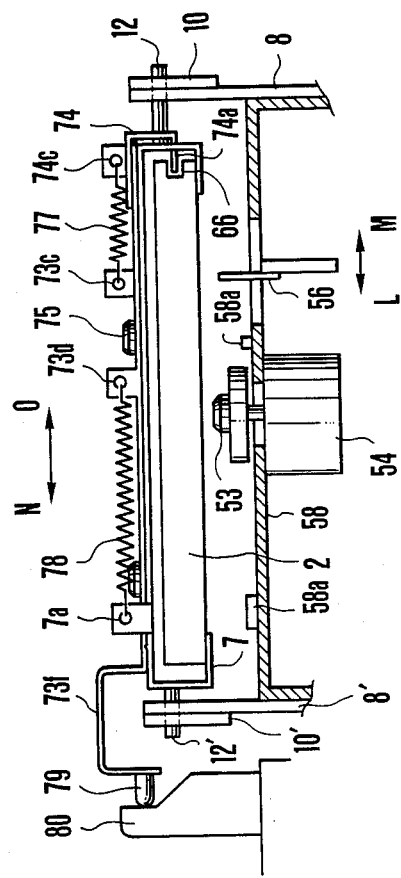

LOADING DEVICE FOR A CASSETTE HAVING A COVER MEMBER

CROSS REFERENCE

Disclosed by reference in this application is my copending U.S. patent application Ser. No. 707,871 filed Mar. 4, 1985 assigned to the assignee of this invention.

BACKGROUND OF THE INVENTION

1. Field of the Invention

This invention relates to a cassette loading device for a recording and/or reproducing apparatus of the kind to be loaded with a cassette which houses therein a record bearing medium and is provided with at least a window for exposing a portion of the medium and a movable cover for the window.

2. Description of the Prior Art

In a recording and/or reproducing apparatus adapted for recording and/or reproducing a signal in or from recording tracks concentrically or helically formed on a disc shaped record bearing medium such as a flexible magnetic disc, it is necessary to provide a device arranged to have a cassette which houses the disc shaped record bearing medium inserted from the outside of the apparatus and to place the cassette at a position for recording and/or reproduction within the apparatus.

In some cases on both sides of the cassette are formed windows, one arranged to allow a magnetic head to confront the recording surface of the magnetic disc and another to have a stabilizer plate come in for stabilizing the disc near the head. If the cassette which has these windows is left unused over a long period of time, large particles of dust enter the cassette and electrostatically stick to the surface of the magnetic disc. If the recording and/or reproducing apparatus is loaded with such a disc to perform recording and/or reproduction, the dust will stick and the magnetic head to degrade the recording and reproducing performance of the apparatus or damage the surfaces of the magnetic discs. In addition to this, the disc surface exposed to the outside through the window is likely to be damaged by external things when they come in contact with the disc.

To solve these problems, there has been proposed an arrangement wherein the cassette is provided with a shutter for movably covering the stabilizer plate inserting window and the magnetic head inserting window therewith; while, on the side of the apparatus, a shutter operating member is provided at a part of a movable cassette holder which is arranged to hold the cassette when the cassette is loaded on the apparatus at a predetermined position. In inserting or taking out the cassette, the shutter can be opened or closed by means of this shutter operating member.

In loading the cassette which is provided with the shutter into a predetermined position by inserting the cassette into the cassette holder, the cassette holder is lowered after the insertion and then must be correctly positioned by pressing it against a positioning member which is provided on the chassis of the recording and-/or reproducing apparatus. For correct positioning, the cassette holder is further lowered to a slight extent relative to the cassette which has already come to a stop. In other words, the cassette holder is arranged to perform an action called an over stroke. At the time of this over-stroke action, if the shutter operating member is lowered while engaged with the shutter attached to the cassette, an exessive force would be exerted thereon. Then, either the shutter operating member might be damaged or the shutter might be damaged in part. Further, in such a case, the cassette might be loaded in a tilted state to prevent satisfactory performance of recording or reproduction.

SUMMARY OF THE INVENTION

It is a principal object of this invention to provide a novel cassette loading device and a recording and/or reproducing apparatus having the cassette loading device which is capable of eliminating the above-mentioned drawbacks of the prior art.

It is a more specific object of this invention to provide a novel cassette loading device or a recording and/or reproducing apparatus having the same and arranged to be loaded with a record bearing medium contained in a cassette which has at least one window openably covered by a movable cover member, wherein even when cassette holder means excessively moves relative to the cassette for correct positioning thereof on the apparatus, the cover member on the side of the cassette and cover member opening/closing or operating means arranged on the side of the apparatus are never damaged; and the cassette is never inadequately loaded.

Under these objects, a cassette loading device embodying an aspect of this invention and incorporated in a recording and/or reproducing apparatus using a cassette which houses a record bearing medium and is provided with at least one window for exposing a portion of the medium and a movable cover for the window, comprises cassette holding means movable between a first position to receive the cassette and a second position to place the cassette at a predetermined loading position, opening and closing means provided on the holding means and engageable with the cover for opening the window when the cassette is inserted into the holding means and for closing the window when the cassette is taken out from the holding means, and control means for controlling the engagement of the opening and closing means with the cover in association with the movement of the holding means between the first and the second positions.

The above and further objects, aspects and features of this invention will be apparent from the following detailed description of a preferred embodiment thereof taken in connection with the accompanying drawings.

BRIEF DESCRIPTION OF THE DRAWINGS

FIG. 1 is an oblique view showing a cassette loading device arranged according to the present invention as an embodiment thereof.

FIG. 3 is a side view showing a shutter operating mechanism.

FIG. 4B being a right side view thereof; FIG. 4C being a left side view thereof; FIG. 4D being a front side view thereof; and FIG. 4E being a reverse side view thereof.

FIG. 5B showing it with the shutter open; and FIG. 5C showing it after having closed the shutter and immediately before the closing claw comes to ride on the side face of the shutter.

FIGS. 6B, 6C and 6D being sectional views of the shutter in its various states which take place when the cassette is inserted including a state immediately before opening, a state immediately after opening and a state after completion of opening the shutter, respectively.

DETAILED DESCRIPTION OF THE PREFERRED EMBODIMENT

In the case of a preferred embodiment of the present invention which will be described below, the invention is applied to a cassette loading device adapted for a recording and/or reproducing apparatus which uses a cassette containing a flexible magnetic disc. However, the invention is of course not only applicable to a device of that kind but also applicable to devices of other kinds that are adapted for recording and/or reproducing apparatuses which use cassettes containing different record bearing media such as optical or electrostatic capacity type disc or sheet or magnetic tape (in a VCR).

Figure 2:
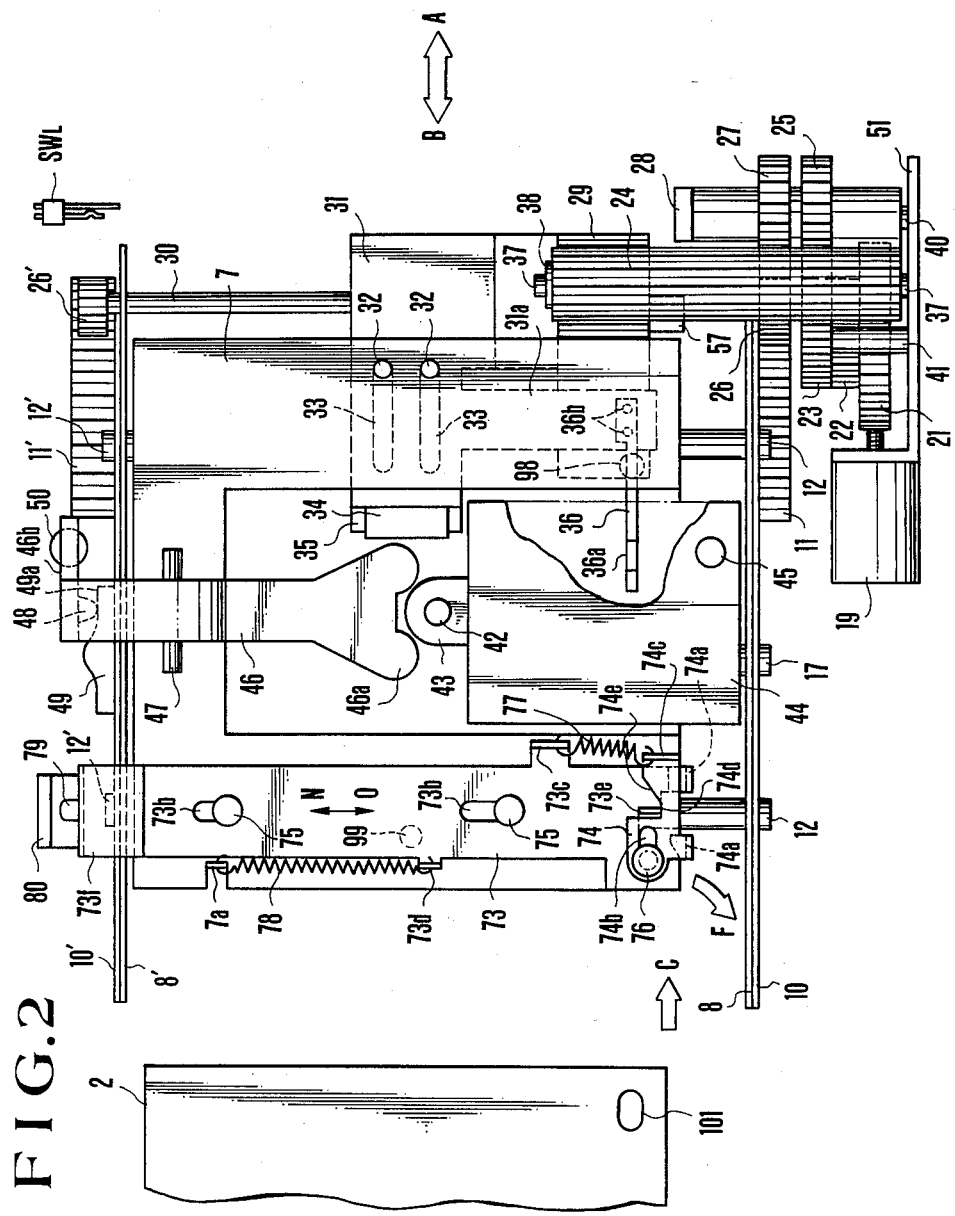
FIG. 2 is a plan view showing the upper side of the embodiment.
Figure 4A:
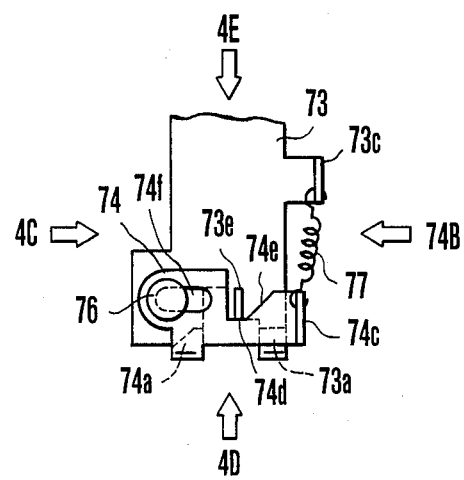
FIGS. 4A-4E are partial illustrations of the shutter operating mechanism, FIG. 4A being a plan view thereof.
Figure 4B:
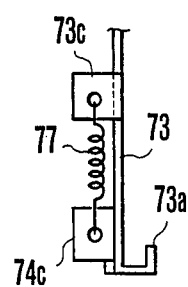
Figure 4C:
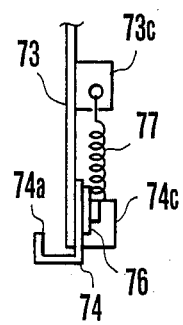
Figure 4D:
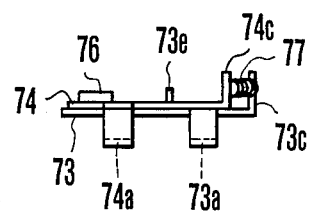
Figure 4E:
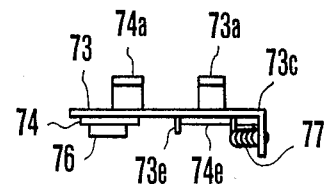
Figure 9:
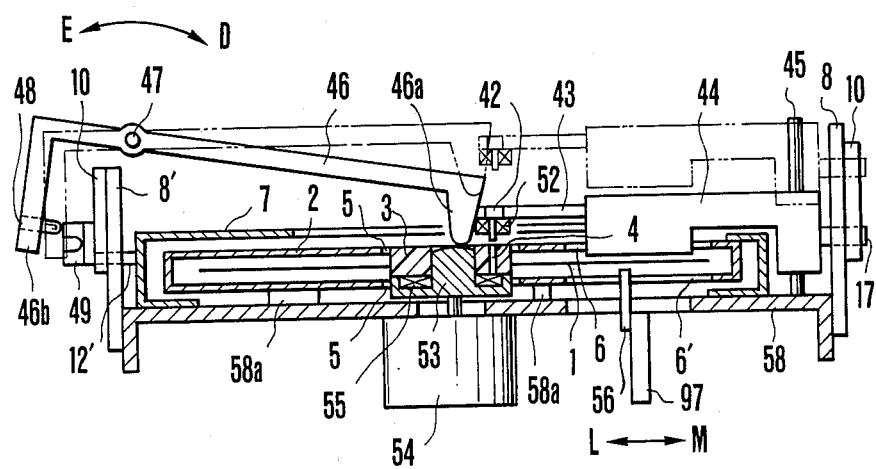
FIG. 9 is a sectional side view showing a center core pressing member and a stabilizer with the cassette in an initial position and in a loading position.

Referring to FIGS. 1 and 2, the illustrations show a flexible magnetic disc 1 which is an example of a disc shaped record bearing medium; a cassette 2 which contains the magnetic disc 1 therein; a center core 3 which is secured to the middle part of the magnetic disc 1 and is made of a plastic material; a rotation pulse generating pin 4 (hereinafter referred to as PG pin) provided in the center core 3; a pair of holes 5 and 5' provided in the upper and lower sides of the cassette 2 in a position corresponding to the center core 3 of the magnetic disc 1; and a window or opening 6 provided in the upper side of the cassette 2 for allowing a disc stabilizer which will be described later to be inserted therethrough. As is shown in FIG. 9, another window or opening 6' is provided in the lower side of the cassette 2 for allowing a magnetic head to be inserted therethrough and is located in a position corresponding to the stabilizer inserting opening 6.

The stabilizer inserting opening 6 and the magnetic head inserting opening 6' are normally covered by a shutter 70 which is a cover member arranged to be movable in the directions of arrows P and Q. The shutter 70 is provided with a shutter closing hole 71 which is formed in one side of the shutter 70 to allow a shutter closing claw 74a to enter thereinto. The shutter closing hole 71 has a lower edge 71b. A groove 66 is arranged along one side of the cassette 2 to have the shutter closing claw 74a and a shutter opening claw 73a enter thereinto as will be described later herein. The groove 66 is provided with a lower edge 66a. A reference numeral 70a denotes an end face of the shutter 70. The shutter 70 opens the openings 6 and 6' when it moves in the direction of arrow Q and closes them when it moves in the other direction of arrow P as will be further described in detail later herein.

The cassette 2 is provided with a pair of posioning holes 101 and 102 which extend through the upper and lower sides thereof for determining the loading position of the cassette 2 in loading a recording and/or reproducing apparatus with the cassette 2. The hole 101 is formed in an elliptic shape at a corner on the same side as the shutter 70 and on the upstream side of the shutter 70 in the direction of arrow C along which the cassette 2 is to be inserted. The other hole 102 is formed in a circular shape in the middle part close to the rear end of the cassette 2.

The embodiment is provided with a cassette holder 7 as cassette holding means which is arranged to receive and hold the inserted cassette 2. Though not shown in the drawings, the cassette holder 7 is provided with a known leaf spring at the ceiling part thereof to press the inserted cassette 2. Two pins 12 are provided on one side of the cassette holder 7, while two pins 12' are provided on another side of the holder 7, as shown in FIG. 2. Side plates 8 and 8' are secured by means of screws or the like to a chassis of the body of a recording and/or reproducing apparatus (not shown). These side plates 8 and 8' are disposed on two opposite sides of the cassette holder 7. Two vertically extending slots 9 are provided in each of the side plates 8 and 8'. The side plate 8 is provided with another slot 16 which also vertically extends. These slots 9 and 16 are arranged to permit the pins 12 which are provided on the sides of the cassette holder 7 and a pin 17 which is provided on one side of a disc stabilizer 44 to be movable up and down, respectively. A slide plate 10 is arranged adjacent to the side plate 8 and is provided with a rack 11 which is formed in a lower end part of the slide plate 10. The slide plate 10 is provided further with two slots 15 which extend in a horizontal direction; two cam slots 13 which are formed in an S-like shape and arranged to restrict the vertical movement of the cassette holder 7; and a large cam slot 18 which has a shape similar to the cam slots 13 and is arranged to restrict the vertical movement of the stabilizer 44. Another slide plate 10' is likewise provided with a rack 11', two slots 15 and two cam slots 13 for restricting the vertical movement of the cassette holder 7. Pins 14 are arranged on the side plate 8 to guide and restrict the sliding movement of the slide plate 10 along the side plate 8 and are slidably engaged in the slots 15 of the slide plate 10. The other side plate 8' is likewise provided with pins 14 which are engaged in the slots 15 of the other slide plate 10'.

Such being the arrangement, the cassette holder 7 is movable up and down between an uplifted position for receiving and taking out the cassette 1 and a lowered position for completing the cassette loading operation for recording or reproduction. With the cassette holder 7 in the cassette loading completed position, a pair of positioning pins 98 and 99 [(FIG. 2) which are secured to a chassis base plate 58 shown in FIG. 9 respectively move into the positioning holes 101 and 102, so that the cassette 2 can be correctly positioned.

A pin 17 is provided on one side of the disc stabilizer 44 and slidably engages in the slot 16 of the side plate 8 and the cam slot 18 of the slide plate 10.

A loading motor 19 is arranged to slide the slide plates 10 and 10′ and a cassette pull-in and eject member 31 for loading and unloading the cassette 2. A worm gear 20 is arranged to be rotated by the loading motor 19. A worm wheel 21 engages with the worm gear 20. A gear 22 is coaxially connected with the worm wheel 21. A gear 23 engages with the gear 22 and is arranged to be rotated by a driving torque received from the gear 22 which coaxially rotates with the worm wheel 21. A gear unit 24 is arranged to transmit the driving torque from the gear 23 to the pull-in and eject member 31 via a rack 29 which is secured to the pull-in and eject member 31. The gear unit 24 is arranged such that, although it transmits the driving torque from the gear 23 to the rack 29, it does not transmit the movement of the rack 29 to the gear 23 and thus serves as one-way clutch (as will be further described later with reference to FIG. 10). With the rotation of the loading motor 19 transmitted to the rack 11 via the worm gear 20, the worm wheel 21, a first partially toothless gear 25, a second partially toothless gear 27 and a gear 26, the slide plate 10 is moved to slide either in the direction of arrow A or in the direction of arrow B. Gear shafts 21a, 37, 40 and 41, for the gears 21 to 25 and 27 are carried by a chassis 51 as shown in FIG. 2. A lever 28 which is coaxially connected with the first and second toothless gears 25 and 27 is arranged to be rotated clockwise when a lever 57 which is provided on one side of the rack 29 moves in the direction of arrow A to come to abut on the lever 28. With the lever 28 thus turned clockwise, the first and second toothless gears 25 and 27 rotate clockwise. The first toothless gear 25 then comes to engage with the gear 22. The first and second toothless gears 25 and 27 are arranged in one unified body. Referring to FIG. 7B, the toothless parts 25a and 27a of these gears 25 and 27 are arranged to have the same angle in the circumferential direction. However, the end of the toothless part 25a of the first toothless gear 25 in the clockwise direction is ahead of the end of the toothless part 27a of the second toothless gear 27 in the clockwise direction. Therefore, when the lever 28 turns clockwise with the lever 57 abutting thereon, the first and second toothless gears 25 and 27 also rotate clockwise at the same time as the lever 28. Then, the first toothless gear 25 first comes to engage with the gear 22. Following this, the gear 22 rotates the first toothless gear 25 clockwise to cause thereby the second toothless gear 27 to engage with the gear 26.

A rotating shaft 30 is arranged to connect the gears 26 and 26′. The gear 26 engages with the rack 11 provided on the slide plate 10 while the gear 26′ engages with the rack 11′ provided on the other slide plate 10′. With these racks 11 and 11′ connected to each other in this manner, the slide plates 10 and 10′ are arranged to simultaneously slide in the same direction.

A cassette pull-in eject member 31 is arranged to further pull the cassette 2 to a predetermined position within the cassette holder 7 when the cassette 2 is inserted along the direction of arrow C into the holder 7 in loading the apparatus with the cassette 2. In taking the cassette 2 out of the holder 7, the member 31 ejects the cassette 2 from this position in the direction reverse to the direction of arrow C. The cassette pull-in and eject member 31 is provided with a cassette receiving part 35 and a leaf spring 34 which is arranged to elastically hold the fore end of the cassette 2 with a relatively weak spring force in conjunction with the cassette receiving part 35. The member 31 is further provided with a sidewise extending arm 31a. Secured to the lower surface of the arm 31a with a screw 36b or the like is an engaging member 36. The engaging member 36 is made of a leaf spring or the like and is arranged to elastically engage at its engaging part 36a with the elliptic positioning hole 101 of the cassette 2 when the fore end face of the cassette 2 comes to abut upon the vertical face of the cassette receiving part 35.

Pins 32 are arranged on the cassette holder 7 to guide the sliding movement of the pull-in and eject member 31 in the direction of arrow A or B. The pull-in and eject member 31 is provided with slots 33 which are formed in a shape extending in the moving direction of arrows A and B and are arranged to engage with the pins 32. The leaf spring 34 is attached to the upper fore end part of the pull-in end eject member 31. The cassette receiving part 35 is disposed at the lower fore end part of the pull-in and eject member 31.

The rack 29 is secured to the pull-in and eject member 31 and has the lever 57 arranged on one side thereof. The rack 29 thus moves together with the pull-in and eject member 31 when the latter slides in the direction of arrow A or B. When the pull-in and eject member 31 slides in the direction of arrow A, the rack 29 therefore also moves in the same direction to have the lever 57 abut on the lever 28. This in turn causes the first and second toothless gears 25 and 27 to rotate clockwise. The rack 29 is engaging with the gear unit 24.

The gear shafts 37, 40 and 41 which are shown in FIG. 2 are carried by a chassis 51. The gear shaft 37 carries the gear unit 24, the gear shaft 40 carries the first and second toothless gears 25 and 27 and the lever 28 while the gear shaft 41 carries the gear 23. For the gear unit 24 carried by the gear shaft 37, there is provided a retaining ring 38.

A detection yoke 42 is arranged as a disc rotation phase detector to detect the PG pin 4 for detecting thereby the rotation phase of the magnetic disc 1. A supporting arm 43 is attached to the disc stabilizer 44 and is arranged to carry the detection yoke 42. The arm 43 thus moves upward and downward together with the stabilizer 44. The stabilizer 44 is arranged to come close to the upper surface of the magnetic disc 1 by descending through the stabilizer inserting window 6 of the cassette 2 and thus stabilizes the magnetic disc 1 for a magnetic head 56 which is opposed to the lower surface of the magnetic disc 1 (FIG. 9). A guide shaft 45 extends through the stabilizer 44 and is set upright on a mounting chassis 58 (FIG. 9).

A center core pressing member 46 is arranged to push the center core 3 of the magnetic disc 1 for mounting the center core 3 on a spindle 53 of a disc rotating motor 54 (FIG. 9). A shaft 47 pivotally carries the center core pressing member 46 and is secured to a chassis (not shown). A slide cam 49 is secured to one side of the slide plate 10′. A pin 48 is planted on a bent end part 46b of the center core pressing member 46 as shown in FIG. 2. The pin 48 is abutting on the slide cam 49. A spring 50 (FIG. 2) is disposed between the bent end part 46b (FIG. 9) of the center core pressing member 46 and a chassis (not shown) which is constantly pulling the end part 46b downward, i.e. urging the member 46 to move counterclockwise on the shaft 47.

Next, the shutter operating mechanism for opening and closing the cover member or shutter 70 provided on the cassette 2 for covering the stabilizer inserting and magnetic head inserting windows 6 and 6' is arranged as described below:

Referring to FIGS. 1, 2, 3, 4A-4E and 5A-5C, a shutter opening member 73 is disposed on the upper surface of a cassette holder 7 with an opening claw 73a at a C shaped bent part formed at the fore end of the shutter opening member 73. A spring peg 73c is arranged on the right side of the shutter opening member 73 to have one end of a spring 77 attached thereto. Two pins 75 are arranged to have the shutter opening member 73 slidable on the cassette holder 7 with the member 73 engaged with the pins 75 at slots 73b formed in the member 73. A coiled spring 78 is arranged between a spring peg 73d of the member 73 and a spring peg 7a of the cassette holder 7 to urge the shutter opening member 73 to move in the obliquely upward direction to the right as viewed on FIG. 1 and in the direction of arrow N as shown in FIGS. 2 and 3. The shutter opening member 73 is provided with an uprising bent part 73e which is arranged to engage the cam part 74e of a shutter closing member 74. A cam follower pin 79 is provided on a tail end bent part 73f of the shutter opening member 73. A cam 80 is arranged to cause the shutter opening member 73 to slide over the holder 7 via the cam follower pin 79. With the member 73 thus caused to slide, the shutter opening claw 73a and a shutter closing claw 74a are controlled to engage and disengage the cassette 2 and a hole 71 of the shutter 70. The cam 80 is fixedly disposed in a position corresponding to the locus of the vertical movement of the cam follower pin 79 caused by the vertical movement of the cassette holder 7.

Next, the shutter closing member 74 is arranged as follows: The shutter closing member 74 is provided with a closing claw 74a at a C shaped bent part formed at the fore end thereof and a slot 74b for engagement with a guide pin 76 which is provided on the opening member 73. An edge face 74d of the shutter closing member 74 is arranged to abut on one end of the bent part 73e of the shutter opening member 73. A cam part 74e continues from the edge face 74d. When the closing member 74 moves to the left relative to the opening member 73 as viewed in FIG. 2, the cam part 74e abuts on one end of the bent part 73e of the opening member 73. Then, this causes the closing member 74 to turn in the direction of arrow F on the guide pin 76 as viewed in FIG. 2. A spring peg 74c is provided at the right end of the closing member 74. A spring 77 is arranged between this spring peg 74c and a spring peg 73c which is disposed at one end of the opening member 73. The spring 77 urges the closing member 74 to turn counterclockwise on the guide pin 76.

The shutter closing claw 74a of the shutter closing member 74 is arranged to move into a shutter closing hole 71 formed in the shutter 70 which is mounted on the cassette 2 shown in FIG. 1. When the cassette 2 is inserted in the direction of arrow A, the opening claw 73a opens the shutter 70. At that time, the closing claw 74a moves into the hole 71. When the cassette 2 is taken out in the direction of arrow B, the shutter 70 is closed by virtue of the closing claw 74a which has moved into the hole 71. To enable the closing claw 74a to easily override the end face 70a of the shutter 70, the closing claw 74a is provided with a tapered part.

The shutter opening member 73 is slidably mounted on the cassette holder 7 by means of the pins 75. The spring 78 is arranged to urge the shutter opening member 73 in the direction of arrow N as shown in FIGS. 2 and 3. The cam follower pin 79 is arranged at the tail end of the member 73 to confront the cam 80. The purpose of this arrangement is as follows: Referring to FIG. 9, during the descent of the cassette holder 7, the lower surface of the cassette 2 abuts on positioning members 58a which are arranged to define a height of the cassette 2 on a chassis base plate 58 a little before the holder 7 reaches a final lowered position at the last stage of the descent thereof. With the height of the cassette 2 thus defined, the cassette holder 7 pushes the cassette 2 further against the positioning member 58a by a leaf spring which is disposed in the ceiling part of the holder 7 and the leaf spring 34 of the pull-in and eject member 31 before the holder 7 comes to a stop by further descending to a predetermined extent. At the time of this further descent, or an over-stroke of the cassette holder 7, the above-stated arrangement prevents any damages of parts from being caused by collision of the closing and opening claws 74a and 73a with the end face 70a of the hole 71 of the shutter 70 and the edge face 66a of the side groove of the cassette 2. During this over-stroke of the cassette holder 7, the opening member 73 is pushed in the direction of arrow O of FIGS. 2 and 3 on the cassette holder 7 by the cam 80 against the force of spring 78. The claws 74a and 73a are thus pushed out of the hole 71 of the shutter and the groove 66 of the cassette 2 to eliminate the possibility of the above-stated damage.

For this purpose, the cam 80 is fixedly arranged in a position corresponding to the locus of the vertical movement of the cam follower pin 79 resulting from the vertical movement of the cassette holder 7 as mentioned in the foregoing. Further, the cam lift of the cam 80 is so arranged that these claws 74a and 73a are disengaged from the shutter 70 and the cassette 2 during the descent of the holder 7, that is, either when the cassette 2 comes to a stop or prior to the stop, though they are allowed to engage the shutter 70 when the holder 7 is in the uplifted position thereof.

The operation of the shutter opening member 73 for opening the shutter 70 will be described with reference to FIGS. 5A and 5B and that of the shutter closing member 74 for closing the shutter 70 will be also described with reference to FIG. 5C as follows: In these drawings of FIGS. 5A-5C, the cassette holder 7 is omitted from the illustrations.

Figure 5A:
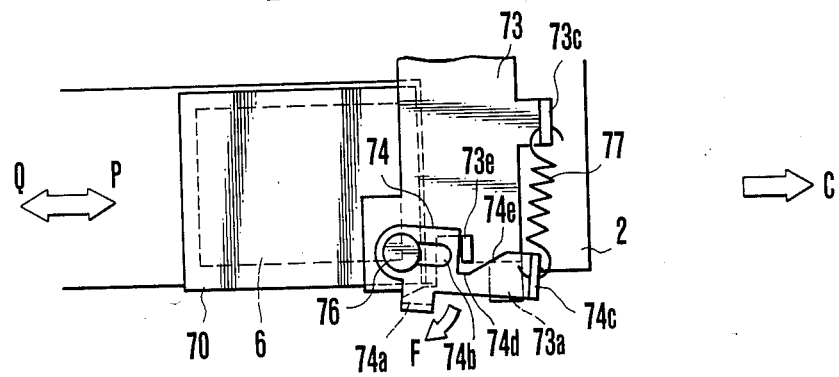
FIGS. 5A-5C show the operations of the shutter operating device, FIG. 5A showing it immediately before a closing claw of a shutter closing member comes to ride on the shutter.
Figure 5B:
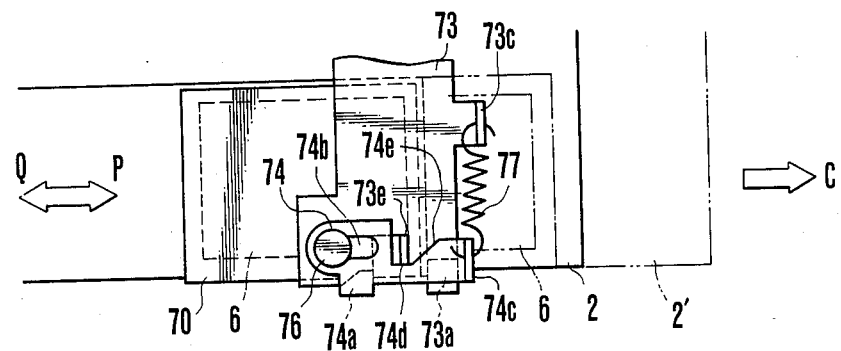

In opening the shutter 70, the closing claw 74a of the shutter closing member 74 and the opening claw 73a of the shutter opening member 73 enter into the groove 66 of the cassette 2 when the cassette 2 is inserted by hand into the cassette holder 7 in the direction of arrow C as shown in FIG. 5A. Under this condition, when the cassette 2 is pushed by hand in the direction of arrow C, the closing claw 74a of the closing member 74 has its tapered part abut on the end face 70a of the shutter 70 mounted on the cassette 2. Then, with the cassette 2 pushed further in the direction of arrow C, the closing member 74 turns in the direction of arrow F about the guide pin 76 against the urging force of the spring 77. The closing claw 74 then rides over the end face 70a of the shutter 70 to come on the side face of the shutter 70. With the closing claw 74 thus positioned on the side face of the shutter 70 while the opening claw 73a of the opening member 73 is in the state of having plunged in the groove 66 provided in one side of the shutter 70, when the cassette 2 is further pushed in the direction of arrow C, the closing claw 74a comes to plunge into the shutter closing hole 71 provided in one side of the shutter 70 as shown by a full line in FIG. 5B and the opening claw 73a abuts on the end face 70a of the shutter 70. Following that, when the cassette 2 is moved further in the direction of arrow C, the opening claw 73a opens the shutter 70 as shown by a two-dot chain line in FIG. 5B. The stabilizer and magnetic head inserting openings 6 and 6' are then exposed.

Figure 5C:
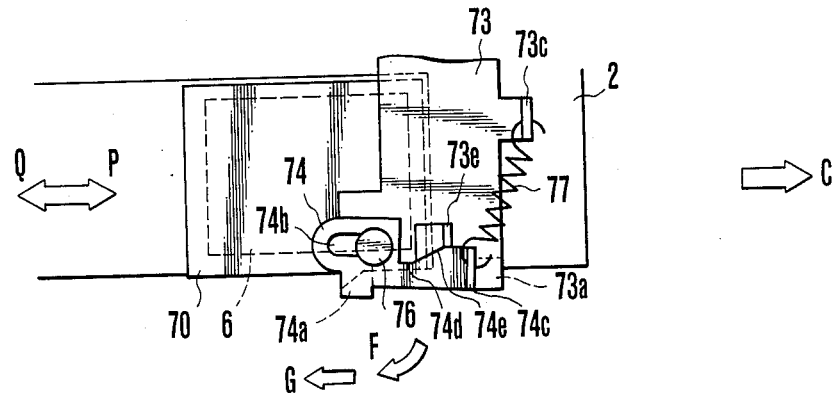

Referring now to FIG. 5C, the shutter closing operation is as follows: With the closing claw 74a in the state of having plunged into the shutter closing hole 71 of the shutter 70, when the cassette 2 is pulled out by hand in the direction reverse to the direction of arrow C, the closing claw 74a comes to abut on the end face 71a of the shutter closing hole 71. Then, with the cassette 2 pulled out further in the direction reverse to the direction of arrow C, the closing claw 74a moves the shutter 70 in the direction of arrow P. The openings 6 and 6' are thus closed by the shutter 70.

With the openings 6 and 6' in a state of having been completely closed, when the cassette 2 is pulled out further in the direction reverse to the direction of arrow C, since the closing claw 74a is abutting on the end face 71a of the shutter closing hole 71, the closing member 74 slides in the direction of arrow G relative to the opening member 73 against the urging force of the spring 77 within the length of the slot 74b having the guide pin 76 fitted therein. This causes the cam part 74e of the closing member 74 to engage the bent part 73e of the opening member 73. Therefore, the closing member 74 turns on the guide pin 76 in the direction of arrow F against the urging force of the spring 77. This brings the closing claw 74 away from the closing hole 71 of the shutter 70.

Figure 6A:
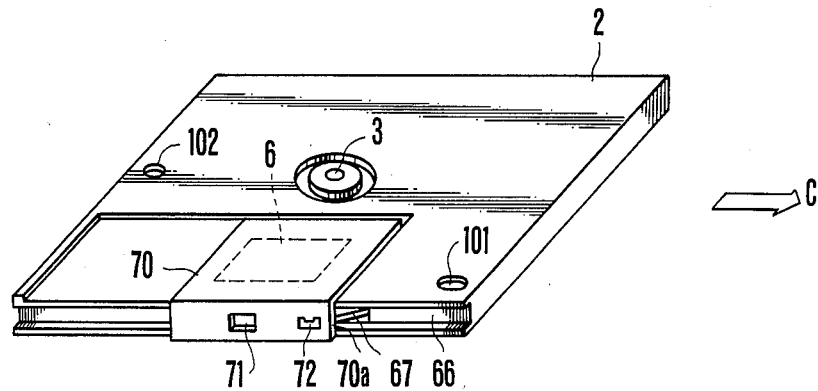
FIGS. 6A–6D show the details of the cassette, FIG. 6A being an oblique view of the cassette.

Next, referring to FIGS. 6A–6D, a shutter lock member which is provided on the cassette 2 is arranged as follows: As shown in FIG. 6A, one side of the shutter 70 is provided with an engaging claw 72 which is arranged to engage a recessed part 67a of a lock member 67 of the cassette 2. The shutter lock member 67 is made of a synthetic resin material and is disposed in the groove 66 formed along the side of the cassette 2 and stowed within the recessed part 68 provided in the cassette 2.

When the cassette 2 which is arranged as described above is inserted into the cassette holder 7 in the direction of arrow C, the closing claw 74a of the closing member 74 and the opening claw 73a of the opening member 73 slide in the groove 66 of the cassette 2.

Figure 6B:
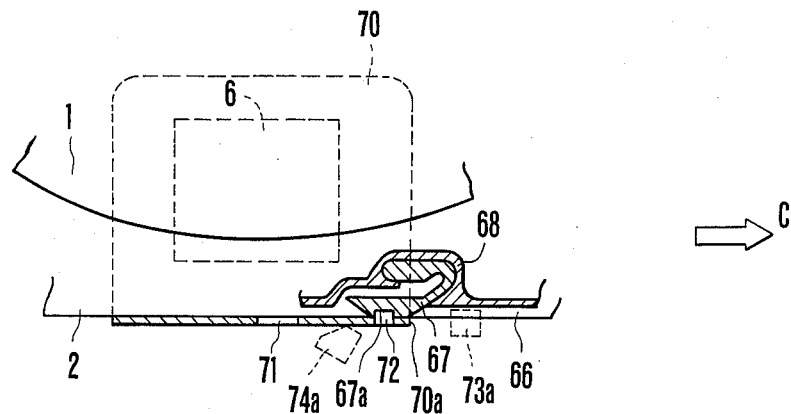

The state of the shutter lock member 67 before the shutter 70 is open is as shown in FIG. 6B. The engaging claw 72 disposed on one side of the shutter 70 engages the recessed part 67a of the shutter lock member 67 to inhibit thereby the shutter 70 from being opened. The closing claw 74a and the opening claw 73a which are in the groove 66 of the cassette 2 slide the inside of the groove 66. Then, the closing claw 74a first comes to engage the shutter lock member 67 at its tapered part. This causes the closing member 74 to turn in the direction of arrow F against the force of the spring 77 as shown in FIG. 5A. The closing claw 74a, therefore, rides on the side face of the shutter 70 to come to a position as indicated by a broken line in FIG. 6B. At that instant, the opening claw 73a is located before the shutter lock member 67.

Figure 6C:
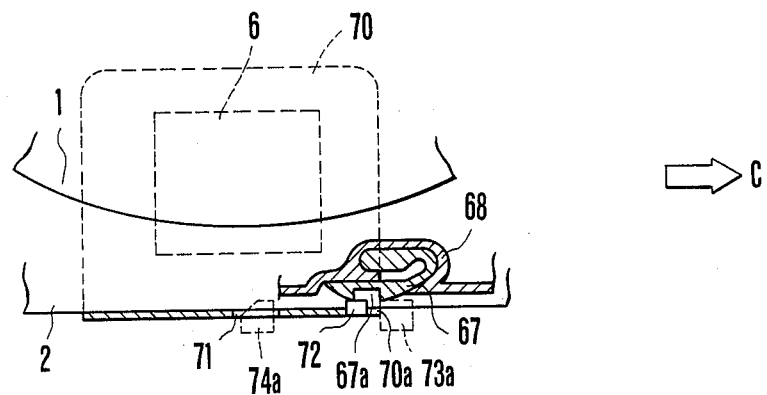

FIG. 6C shows a condition immediately after commencement of a shutter opening operation. The closing claw 74a which has been in the position as shown in FIG. 6B then slides on the side face of the shutter 70 and enters into the shutter closing hole 71. At that time, the opening claw 73a pushes the shutter lock member 67 to disengage the engaging claw 72 and the recessed part 67a from each other. The end face of the opening claw 73a abuts on the end face 70a of the shutter 70 to open the shutter 70 by retaining the shutter 70 while the cassette 2 is further inserted in the direction of arrow C.

Figure 6D:
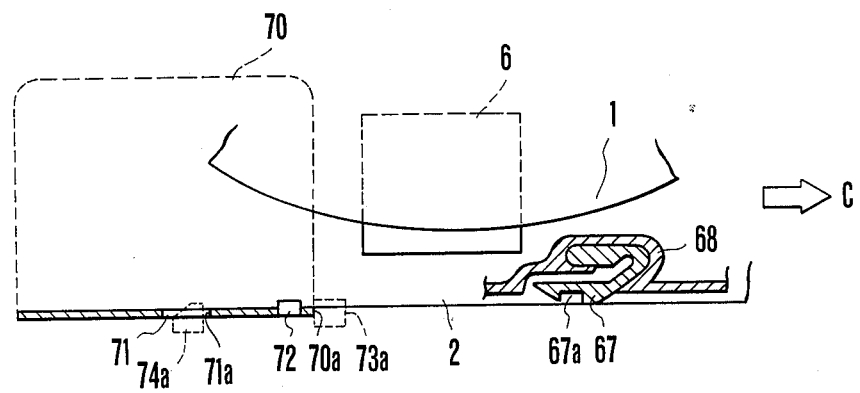

FIG. 6D shows a condition after completion of the shutter opening operation. With the shutter 70 having been opened, the stabilizer inserting opening 6 and the magnetic head inserting opening 6' of the cassette 2 are exposed.

Next, when the cassette 2 is moved in the direction reverse to the direction of arrow C under the condition shown in FIG. 6D for taking out the cassette 2, the closing claw 74a which has been in the closing hole 71 of the shutter 70 comes to abut on the end face 71a of the hole 71. The closing claw 74a thus retains the shutter 70 while the cassette 2 is moved in the direction reverse to the direction of arrow C, so that the shutter 70 can be closed (see FIG. 6C). With the shutter 70 having been completely closed, the engaging claw 72 of the shutter 70 engages the recessed part 67a of the lock member 67 to keep the shutter 70 in the closed state. Then, with the cassette 2 moved further in the direction reverse to the direction of arrow C, the cam part 74e of the closing member 74 engages the bent part 73e of the opening member 73 to cause the closing member 74 to turn in the direction of arrow F as described in the foregoing (FIG. 5C). Then, this disengages the closing claw 74 from the closing hole 71 (see FIG. 6B).

Figure 7A:
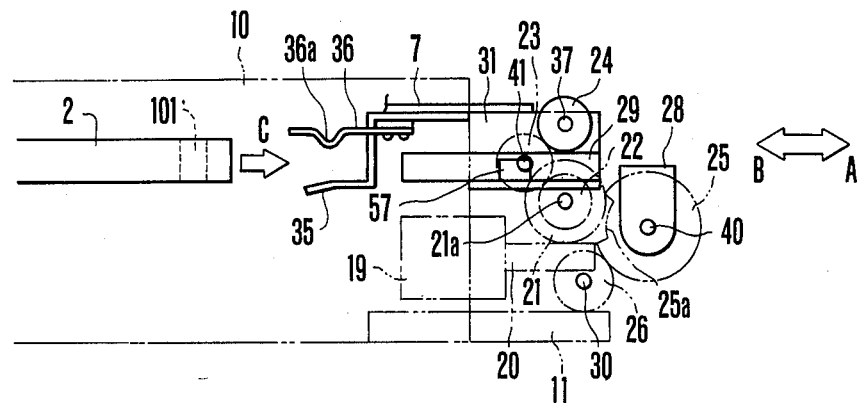
FIG. 7A is a side view showing a cassette and a gear arrangement of the embodiment before the cassette is inserted.
Figure 7B:
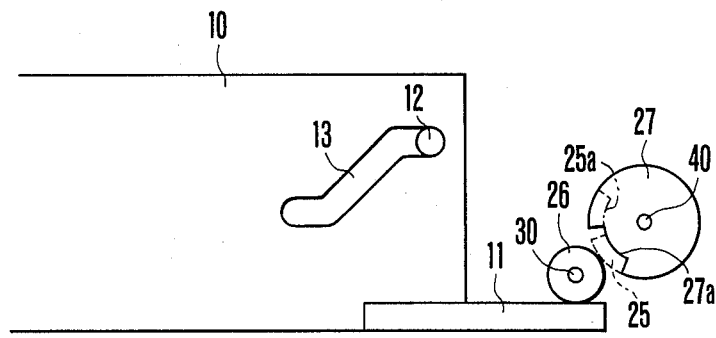
FIG. 7B is a side view showing engagement between a part of a second toothless gear and a gear train of the gear arrangement when the cassette is inserted.
Figure 8:
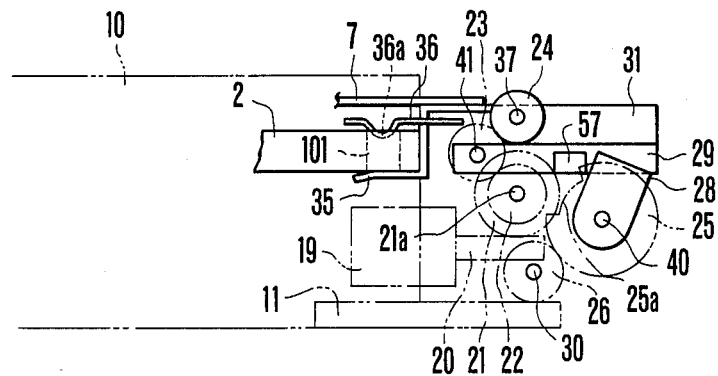
FIG. 8 is a side view showing the cassette inserted and the gear arrangement in driving operation.

FIGS. 7A, 7B and 8 show the operation of the gear mechanism in the cassette loading device. The cassette 2 is inserted from the direction of arrow C into the cassette holder 7 as shown in FIG. 7A. The fore end of the cassette 2 is sandwiched in between the leaf spring 34 and the cassette receiving part 35 provided on pull-in and eject member 31. Then, the cassette 2 is manually pushed further in the direction of arrow A. At that time, the engaging member 36 engages at its engaging part 36a with the positioning hole 101 of the cassette 2. The loading motor 19 has not yet been started at that time. Thus, the lever 57 which is provided on one side of the rack 29 of the pull-in and eject member 31 is in a position as shown in FIG. 7A. Therefore, the lever 28 which is coaxially connected to the first toothless gear 25 is also in a position shown in FIG. 7A. Accordingly, the toothless part 25a of the first toothless gear 25 is confronting the gear 22 and the gear 22 is not engaging with the first toothless gear 25.

As for the second toothless gear 27, the toothless part 27a thereof is also confronting the gear 26 as shown in FIG. 7B. Therefore, the gear 26 is not engaging with the second toothless gear 27. Since the loading motor 19 has not been started as yet, the slide plate 10 does not slide. The pins 12 and 12' which are protruding from the side face of the cassette holder 7 are thus located in the upper parts of the cam slots 13.

With the fore end of the cassette 2 sandwiched in between the leaf spring 34 and the cassette receiving part 35 of the pull-in and eject member 31 as shown in FIG. 7A, when the cassette 2 is further manually pushed in the direction of arrow A, this pushing acting causes the pull-in and eject member 31 to slide in the direction of arrow A. And the rack 29 also moves in the direction of arrow A. Then, since the gear unit 24 which engages with the rack 29 is provided with the one-way clutch, no rotating torque is applied to the gear 23. When the pull-in and eject member 31 slides to a predetermined position, a cassette insertion detecting switch (which will be described later with reference to FIG. 12) operates to cause the loading motor 19 to start rotating.

When the loading motor 19 rotates in the normal direction, its rotation torque is applied to the gear 23 via the worm gear 20 and the worm wheel 21. The gear 23 rotates clockwise. The clockwise rotation of the gear 23 causes the gear unit 24 to rotate counterclockwise. Then, the one-way clutch provided within the gear unit 24 transmits the counterclockwise rotation of the gear unit 24 to the rack 29. This moves the pull-in and eject member 31 via the rack 29 further in the direction of arrow A. At that time, the cassette 2 is pulled into the cassette holder 7 by the engaging member 36 provided on the pull-in and eject member 31 in the same direction.

On the other hand, the lever 57 which is disposed on one side of the rack 29 also moves in the direction of arrow A and comes to abut on the lever 28 and to turn it clockwise. This causes the first and second toothless gears 25 and 27 to rotate clockwise. The first toothless gear 25 then engages with the gear 22. The gear 22 causes the first toothless gear 25 to rotate clockwise. When the first toothless gear 25 is rotated clockwise, the second toothless gear 27 is also caused to rotate clockwise and to engage with the gear 26. Therefore, the rotation torque of the loading motor 19 is transmitted to the rack 11 via the worm gear 20, the worm wheel 21, the gear 22, the first and second toothless gears 25 and 27 and the gear 26, and is further transmitted to the rack 11' via the gear 26'. As a result, the slide plates 10 and 10' begin to slide in the direction of arrow A.

The above-described cassette pull-in completion condition is shown in FIG. 8.

FIG. 9 shows further details of the disc stabilizer 44 and the center core pressing member 46. The sliding action of the slide plate 10 in the direction of arrow A causes through its cam slot 18 the stabilizer 44 to descend from its initial position indicated by a two-dot chain line to a position indicated by a full line along a guide shaft 45. Following this downward movement of the stabilizer 44, the detection yoke 42 and the detection coil 52 which form a pulse generator and are attached to the support arm 43 also come down to confront the PG pin 4 of the center core 3 of the disc 1.

The center core pressing member 46 turns in the direction of arrow D on the turning center shaft 47 as shown in FIG. 9, since the pin 48 moves from the right-hand side low lift face 49a to the middle high lift face 49b of the slide cam 49 as the cam 49 moves in the direction of arrow A in FIG. 2. The fore end 46a of the center core pressing member 46 then exerts a pushing force on the center core 3 to forcedly mount the core 3 onto the spindle 53. Then, with the slide cam 49 further moving in the direction of arrow A in FIG. 2, the pin 48 is placed on the left low lift face 49c of the cam 49. Therefore, the center core pressing member 46 is brought back to its original position as shown by the two-dot chain line by the spring 50. With the slide cam 49 thus provided with the low lift face 49c on the left side of the high lift face 49b formed in the middle thereof, the center core pressing member 46 can be kept in a state of being uplifted from its position indicated by the full line. Therefore, the center core pressing member 46 never imposes any load on the rotation of the magnetic disc 1. Further, in this case, the slide cam 49 is arranged to actuate the center core pressing member 46 during a remaining portion of the sliding stroke of the slide plate 10' which takes place after the cassette holder 7 has moved down to the cassette loading position, or a second position. A magnet 55 is provided on the spindle 53 for exerting a magnetic attraction on a soft magnetizable member (not shown) which is buried in the center core 3, so that the mounting and positioning action on the center core 3 can be facilitated.

Figure 10:
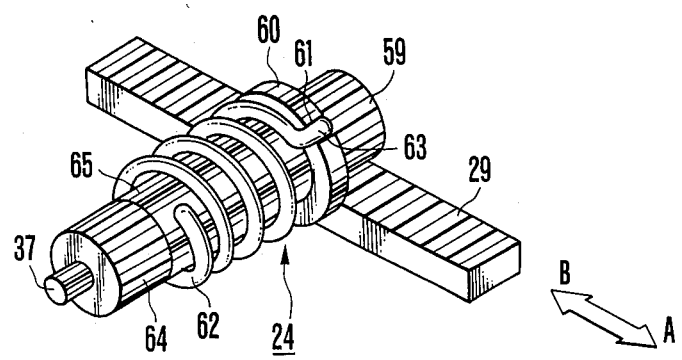
FIG. 10 is an oblique view showing a one-way clutch provided in a gear unit of the embodiment.

FIG. 10 shows, by way of example, the arrangement of the gear unit 24 which is provided with the one-way clutch. A gear 59 is arranged to engage with the rack 29. A flange 60 which has a notch 61 is formed in one unified body with the gear 59. A coiled spring 62 has a bent part 63 fitted in the notch 61 of the flange 60. A gear 64 is arranged to transmit a driving force and engages with the gear 23 as shown in FIG. 8. A cylindrical part 65 is formed in one unified body with the gear 64. The gear shaft 37 is arranged to have the gear unit 24 which is arranged in this manner carried by the chassis 51 as shown in FIG. 2.

The gear unit 24 operates in the following manner:
When the cassette 2 is manually inserted, the rack 29 moves in the direction of arrow A together with the pull-in and eject member 31. This causes the gear 59 to rotate counterclockwise on the gear shaft 37. At the same time, the flange 60 which is formed in one unified body with the gear 59 also rotates counterclockwise. Accordingly, the coiled spring 62 which has its bent part 63 fitted in the notch part 61 also rotates counterclockwise. However, since this rotating direction of the coiled spring 62 enlarges the inner diameter thereof, the rotation torque is not transmitted to the gear 64 and the cylindrical part 65 which is formed in one unified body with the gear 64. Therefore, the gear 59, the flange 60 and the coiled spring 62 rotate in vain.

Next, when a rotation torque is given to the gear 64 from the gear 23 and the gear 64 rotates counterclockwise, the cylindrical part 65 also rotates counterclockwise. This counterclockwise rotation of the cylindrical part 65 takes place in such a way as to cause the coiled spring 62 to be wound around the cylindrical part 65. Then, a frictional force is exerted between the coiled spring 62 and the cylindrical part 65 and the inner diameter of the former becomes smaller, so that the coiled spring 62 is tightly wound around the cylindrical part 65. Then, a driving force is transmitted to the rack 29 via the coiled spring 62, the bent part 63, the notch part 61, the flange 60 and the gear 59. This driving force causes the rack 29 to move in the direction of arrow A.

In ejecting the cassette 2, the gear 64 receives a rotation torque from the gear 23 and rotates clockwise. This rotating direction enlarges the inner diameter of the coiled spring 62. Here, it must be noted that, although the one-way clutch is arranged so that it transmits a driving torque only for rotation in one direction and not for rotation in the reverse direction, it is arranged to be capable of transmitting a driving torque also for reverse rotation if a load imposed on the gear which is receiving the driving force is larger than a load on the gear disposed on the idle rotation side. Therefore, the rack 29 can be shifted in the direction of arrow B with an idle rotation torque brought about by arranging a load which is imposed on the side of the gear 64 by the gear train consisting of the gears 23 and 22, the worm wheel 21, the worm gear 20 and the first and second toothless gears 25 and 27 to be larger than a load imposed by some frictional force between the coiled spring 62 and the cylindrical part 65, the weight of the cassette 2 on the rack 29, a frictional force between the pull-in and eject member 31 and the cassette holder 7, etc.

Figure 11:
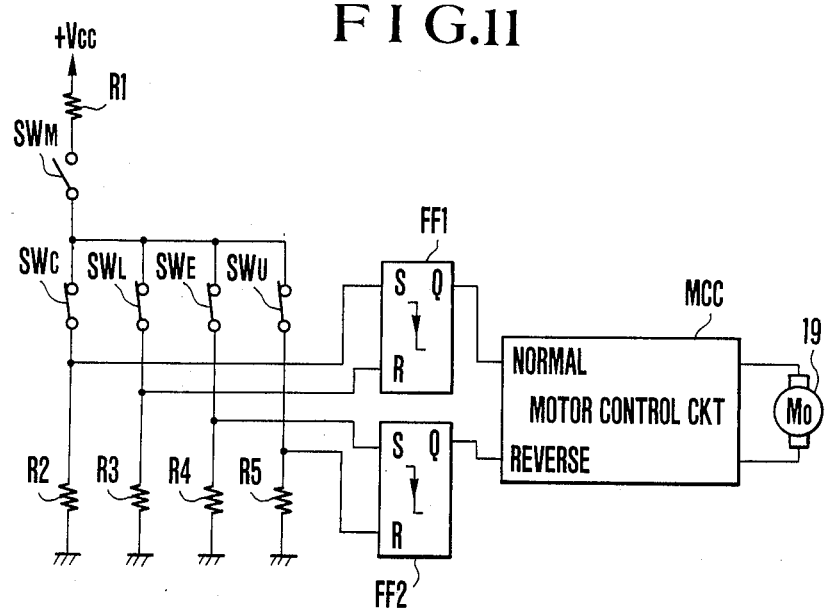
FIG. 11 is a circuit diagram showing the circuit arrangement of a control circuit provided for a loading motor to be used for cassette loading and ejecting operations.

FIG. 11 shows, by way of example, a control circuit for the loading motor 19 which is provided for loading and ejecting the cassette 2 mentioned in the foregoing.

Referring to FIG. 11, SWH denotes a main switch which is connected via a resistor R1 to a power source +Vcc. SWC denotes a type of cassette insertion detecting switch which is disposed, for example, at a part of the cassette holder 7. This detecting switch SWC is arranged to be opened by the pull-in end eject member 31 when the member 31 slides to a predetermined position in the direction of arrow A is shown in FIG. 8. The switch SWC is connected in series with the main switch SWM together with a resistor R2. SWL denotes a normally closed type cassette loading completion detecting switch which is arranged, as shown in FIGS. 1 and 2, for example, to be opened by the slide plate 10' when the slide plate 10' comes to an end of its sliding action in the direction of arrow A. The switch SWL is connected in series with the main switch SWM together with a resistor R3. SWE denotes a normally closed type ejection switch SWE which is arranged to be opened by the operation of an eject key (not shown). The switch SWE is connected in series with the main switch SWM together with a resistor R4. SWU denotes a cassette ejection completion detecting switch which is disposed, for example, at a part of the cassette holder 7. This detecting switch SWU is arranged to be opened by the pull-in and eject member 31 when the member 31 slides to a predetermined position in the direction of arrow B as shown in FIGS. 1, 2 and 7A. The cassette ejection completion detecting switch SWU is connected in series with the main switch SWM together with a resistor R5. FF1 denotes a first fall-synchronizing type RS flip-flop which is arranged to be set by a shift of a potential at a connection point between the cassette insertion detecting switch SWC and the resistor R2 from a high level to a low level and, after that, to be reset by a shift of a potential at a connection point between the cassette loading completion detecting switch SWL and the resistor R3 from a high level to a low level. FF2 denotes a second fall-synchronizing type RS flip-flop which is arranged to be set by a shift of a potential at a connection point between the ejection switch SWE and the resistor R4 from a high level to a low level and, after that, to be reset by a shift of a potential at a connection point between the cassette ejection completion detecting switch SWU and the resistor R5 from a high level to a low level. MCC denotes a motor control circuit which is arranged to cause the loading motor 19 to rotate in the normal direction (to rotate clockwise in the case of the above-stated example) for loading the cassette 2 in response to the high level of the output Q of the first flip-flop FF1 and to cause, in response to the high level of the output Q of the second flip-flop FF2, the motor 19 to rotate in the reverse direction (rotate counter-clockwise). The motor control circuit MCC brings the loading motor 19 to a stop in response to the low level of the outputs Q of the first flip-flop FF1 and the second flip-flop FF2.

With the circuitry arranged as described above, in loading the apparatus with the cassette 2, the cassette 2 is inserted after the main switch SWM is closed. When the cassette 2 is pushed in to a certain extent, the pull-in and eject member 31 slides in the direction of arrow A. And then, when the pull-in and eject member 31 slides to the predetermined position in the direction of arrow B, the cassette insertion detecting switch SWC is opened and the first flip-flop FF1 is set. Accordingly the level of the output Q of the first flip-flop FF1 becomes high, and thereby the motor control circuit MCC causes the loading motor 19 to rotate in the normal direction for the cassette loading. Then, the various actions which have been described in the foregoing are performed for the cassette loading. Upon completion of the cassette loading operation, the slide plate 10' reaches the end point of its sliding action in the direction of arrow A and the cassette loading completion detecting switch SWL is opened. Accordingly, the first flip-flop FF1 is reset and thereby the level of the output Q of the first flip-flop FF1 becomes low. Thus, the motor control circuit MCC brings the rotation of the motor 19 to a stop.

In ejecting the cassette 2, the eject key (not shown) is operated to open the ejection switch SWE. With the switch SWE opened, the second flip-flop FF2 is set and the level of its output Q becomes high. In response to this, the motor control circuit MCC causes the loading motor 19 to rotate in the reverse direction for ejecting the cassette 2. Various actions are then performed for ejecting the cassette 2 as described in the foregoing. At the end of the cassette ejecting operation, the pull-in and eject member 31 slides in the direction of arrow B. And then, when the pull-in and eject member 31 slides to the predetermined position in the direction of arrow B and a part of the cassette 2 comes to protrude from the outside of the recording and/or reproducing apparatus, the cassette ejection completion detecting switch SWU is opened to reset the second flip-flop FF2. Accordingly, the level of the output Q of the second flip-flop FF2 becomes low and thereby the motor control circuit MCC brings the reverse rotation of the loading motor 19 to a stop.

Figure 12:
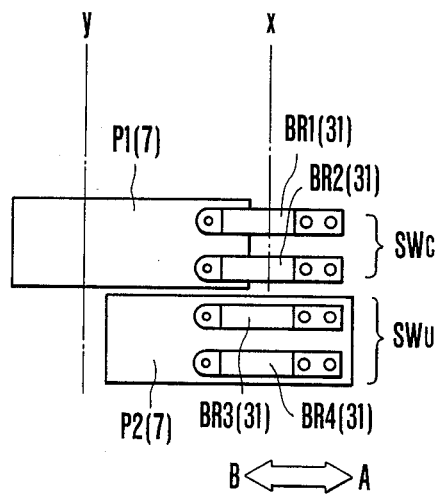
FIG. 12 is an illustration of the arrangement of a cassette insertion detecting switch and a cassette ejection completion detecting switch of the embodiment.

FIG. 12 shows, by way of example, the specific arrangement of the above-stated switches SWC and SWU. In the drawing, they are shown as viewed from the lower side of the cassette holder 7. The backside of the upper surface, i.e. the ceiling, of the cassette holder 7 is provided with conductor patterns P1 and P2. The conductor patterns P1 and P2 are arranged on a part covered with an insulator member. On the other hand, sliding brushes BR1-BR4 are secured to the pull-in and eject member 31 by means of some fixing members such as screws or the like. In this case, these brushes BR1-BR4 are arranged on a part of the member 31 covered with an insulator member. The brushes BR1 and BR2 form the switch SWC and the brushes BR3 and BR4 the switch SWU. A reference symbol "x" indicates a cassette ejection completion point and a symbol "y" indicates a cassette manual insertion completion point. With the switches SWC and SWU arranged in this manner, the brushes BR1-BR4 slide accordingly as the pull-in and eject member 31 slides in the direction of arrow A or B. In the case of sliding in the direction of arrow A, the switch SWC is opened at the manual insertion completion point "y". In the case of sliding in the direction of arrow B, the switch SWU is opened at the ejection completion point "x". These switches SWC and SWU may be conversely arranged by having the brushes BR1–BR4 attached to the ceiling of the cassette holder 7 and the conductor patterns P1 and P2 formed on the pull-in and eject member 31.

The operation of the whole device in loading the apparatus with the cassette 2 is as follows: When the cassette 2 is inserted into the cassette holder 7 from the direction of arrow C as shown in FIGS. 1 and 2, the closing claw 74a of the closing member 74 and the opening claw 73a of the opening member 73 enter the groove 66 of the cassette 2. Then, with the cassette 2 further inserted, the closing claw 74a comes to abut on the shutter lock member 67 and the end face 70a of the shutter 70. This causes the closing member 74 to turn about the guide pin 76 against the urging force of the spring 77 as shown in FIG. 5A in the direction of arrow F. Accordingly, the closing claw 74 moves over the end face 70a of the shutter 70 to slide on the side face of the shutter 70 (FIG. 6B). The closing claw 74a then enter the shutter closing hole 71 (FIG. 5B and FIG. 6C). At that time, the pushing action of the opening claw 73a unlocks the shutter lock member 67 from the shutter 70. Then, with the cassette 2 pushed further in the direction of arrow A, the opening claw 73a pushes the shutter 70 at its end face 70a to slide it in the direction of arrow Q. The shutter 70 is thus opened (FIG. 6D).

After that, when the cassette 2 is further pushed in to have the fore end part thereof pinched between the leaf spring 34 and the cassette receiving part 35 of the cassette pull-in and eject member 31, the engaging part 36a of the engaging member 36 engages the positioning hole 12 of the cassette 2. When the cassette 2 is still further pushed in under this condition, the cassette pull-in and eject member 31 is caused to slide in the direction of arrow A along the slot 33 which is engaging with the pin 32 provided on the cassette holder 7. The rack 29 which is secured to the cassette pull-in and eject member 31 also moves in the direction of arrow A. With the rack moving in the direction of arrow A, the gear 59 which engages the rack 29 as shown in FIG. 10 rotates counterclockwise. At the same time, the flange 60 which is formed in one unified body with the gear 59 also rotates counterclockwise. The coiled spring 61 which engages the notch part 61 then also rotates counterclockwise. Since this rotating direction causes the inner diameter of the coiled spring 62 to increase, and rotation torque is transmitted to the gear 64 and the cylindrical part 65 which is formed in one unified body with the gear 64. The gear 59, the flange 60 and the coiled spring 62 thus idly rotate to transmit no driving torque to the gear 23. With the cassette pull-in and eject member 31 pushed in further in the direction of arrow A, when it comes to a predetermined position, the cassette insertion detecting switch SWC which is shown in FIGS. 11 and 12 is opened. The first flip-flop FF1 is set. The level of the Q output of the flip-flop FF1 becomes high. The control circuit MCC then causes the loading motor 19 to begin to rotate clockwise. With the motor 19 thus rotated, a rotation torque is transmitted to the gear unit 24 to rotate the same in the counterclockwise direction through the worm gear 20, the worm wheel 21 and the gears 22 and 23. With regard to the gear unit 24, as has been described with reference to FIG. 10, the cylindrical part 65 which is formed in one unified body with the gear 64 rotates counterclockwise when the gear 64 is rotated counterclockwise. This is because the coiled spring 62 is wound tighter around the cylindrical part 65 as it rotates in a state of being wound around the cylindrical part 65. The gear unit 24, therefore, causes the rack 29 to continuously move in the direction of arrow A through the coiled spring 62, the bent part 63, the notch part 61, the flange 60 and the gear 59. This causes the cassette pull-in and eject member 31 to slide in the direction of arrow A along the slot 33 with which the pin 32 is slidably engaged. Then, since the positioning hole 101 is engaging the engaging part 36a of the engaging member 36, the cassette 2 is pulled and moved in the same direction into the cassette holder 7.

In their initial positions, the first and second toothless gears 25 and 27 are caused by a spring and a positioning member (not shown) to have their toothless parts respectively opposed to gears 22 and 26 (FIGS. 7A and 7B). Therefore, the first and second toothless gears 25 and 27 do not rotate when the gear 22 rotates. The lever 57 also moves in the direction of arrow A accordingly as the rack 29 moves in the direction of arrow A. The lever 57 thus comes to abut on the lever 28 to cause the latter to turn clockwise as shown in FIG. 8. Both the first and second toothless gears 25 and 27 which are coaxially coupled with the lever 28 rotate clockwise. Then, the first toothless gear 25 first comes to engage the gear 22 which is rotating counterclockwise. This causes the first toothless gear 25 to rotate clockwise. The clockwise rotation of the first toothless gear 25 causes the second toothless gear 27 to rotate further clockwise and to engage the gear 26. The gear 26 then rotates counterclockwise to move the rack 11 in the direction of arrow A. With the rack 11 thus moved, the slide plate 10 moves in the direction of arrow A. The rotation torque of the gear 26 is transmitted via the rotation shaft 30 to the gear 26' which engages the rack 11' of the other slide plate 10'. The slide plate 10', therefore, also slides in the direction of arrow A. The slide cam 49 is also moved in the direction of arrow A.

The pins 12 and 12' which are disposed on the sides of the cassette holder 7 move downward being guided by the cam slots 13 which are provided respectively in the slide plates 10 and 10'. Accordingly, the cassette holder 7 begins to move downward.

The cassette pull-in and eject member 31 also moves downward together with the cassette holder 7. Thus, the rack 29, at the same time, begins to descend. The descent of the rack 29 disengages it from the gear unit 24, and thereby the cassette pull-in and eject member 31 stops sliding in the direction of arrow A. The rack 11 continues to receive the rotation torque of the loading motor 19 via the worm gear 20, the worm wheel 21, the gear 22, the first and second toothless gears 25 and 27 and the gear 26. Therefore, the slide plate 10 continues to move in the direction of arrow A. Accordingly, the cassette holder 7 also continues to descend. The descent of the holder 7 comes to a stop when it reaches the cassette loading completing position (or the second position thereof).

In this instance, as shown in FIG. 9, the cassette 2 which is carried by the cassette holder 7 comes to have its position restrictively defined by the positioning member 58a disposed on the chassis base plate 58 with the lower side of the cassette coming to abut on the positioning member 58a a little before the cassette holder 7 reaches the final lowered position thereof as shown in FIG. 9. At that time, the over-stroke of the cassette holder 7 causes the leaf spring 34 of the cassette pull-in and eject member 31 and a leaf spring (not shown) which is disposed within the holder 7 to urge and press the cassette 2.

As mentioned in the foregoing, the shutter opening member 73 is mounted by the pin 75 to be slidable over the cassette holder 7 and is urged by the spring 78 to move in the direction of arrow N while the cam 70 is arranged for the cam follower pin 79 provided on the tail end of the member 73. Therefore, when the cassette holder 7 comes down, the cam 80 causes the shutter opening member 73 to slide in the direction of arrow O against the spring 78 as shown in FIGS. 2 and 3. As a result, the opening claw 73a of the member 73 and the closing claw 74a of the shutter closing member 74 are disengaged from the cassette 2 and the shutter 70 either when the cassette 2 comes to a stop or prior to that. This precludes the possibility of any damage that otherwise would occur between them.

With the rotation torque of the loading motor 19 transmitted to the gear 26 via the worm gear 20, the worm wheel 21, the gear 22 and the first and second toothless gears 25 and 27, the rotation torque of the gear 26 is imparted to the gear 26' via the rotation shaft 30. The rack 11' and, accordingly, the slide plate 10' are caused to move in the direction of arrow A. This causes the slide cam 49 which is secured to the side face of the slide plate 10' to move also in the direction of arrow A. When the pin 48 of the center core pressing member 46 which is abutting on the low lift face 49a of the slide cam 49 comes to the high lift face 49b of the cam 49, the center core pressing member 46 turns in the direction of arrow D on the center shaft 47. The center core pressing member 46 thus comes to a position indicated by a full line from a position indicated by a two-dot chain line in FIG. 9. The fore end pressing part 46a of the member 46 then applies a pushing force to the center core 3. The center core 3 is thus mounted with pressure on the spindle 53 of the disc rotating motor 54. With the slide plate 10' moved further in the direction of arrow A, the pin 48 comes to another low lift face 49c of the cam 49. Then, this causes the center core pressing member 46 to turn in the direction of arrow E to come back to the position indicated by the two-dot chain line in FIG. 9.

During the descent of the cassette holder 7, the disc stabilizer 44 moves down from the position shown by a two-dot chain line to a position shown by a full line in FIG. 9 being guided by the guide shaft 45 through the cam slot 18 provided in the slide plate 10. In this manner, the disc stabilizer comes to closely confront the upper surface of the magnetic disc 1 to stabilize the magnetic disc 1 relative to the magnetic head 56 when the disc 1 is rotated.

When the slide plates 10 and 10' come to the end of their sliding motions in the direction of arrow A through the processes described above, the slide plate 10' opens the cassette loading completion detecting switch SWL. With the switch SWL opened, the first flip-flop FF1 is reset. The level of the Q output of the flip-flop FF1 becomes low. The motor control circuit MCC then brings the normal rotation of the loading motor 19 to a stop.

Then, the disc rotating motor 54 is started to rotate the magnetic disc 1. The magnetic head 56 then performs a signal recording or reproducing operation.

During the recording or reproducing operation, a known head shifting device either continuously or intermittently shifts the magnetic head 56 through a head carriage 97 as shown in FIG. 9 in the direction of arrow L or M, which is a radial direction of the disc 1.

Next, the cassette ejecting operation of the embodiment is described as follows:

When an eject key or the like (not shown) is operated, the rotation of the disc rotating motor 54 which is shown in FIG. 9 comes to a stop. Then, an eject switch SWE which is shown in FIG. 11 is opened. A second flip-flop FF2 is set. The level of the Q output of the flip-flop FF2 becomes high. As a result of that, the motor control circuit MCC causes the loading motor 19 to rotate counterclockwise for ejecting the cassette 2. With the loading motor 19 rotating counterclockwise, the worm gear 20 also rotates counterclockwise. The gear 22 rotates clockwise to cause the gear 23, the first and second toothless o gears 25 and 27 to rotate counterclockwise. The counterclockwise rotation of the gear 23 causes the gear unit 24 to rotate clockwise. The counterclockwise rotation of the second toothless gear 27 is transmitted to the gear 26. The gear 26 rotates clockwise. The clockwise rotation of the gears 26 and 26' causes the racks 11 and 11' to begin to move in the direction of arrow B. The slide plates 10 and 10' likewise begin to slide in the direction of arrow B.

The cam 49 then moves in the direction of arrow B to change the location of the pin 48 from the low lift face 49c to the high lift face 49b. Therefore, the center core pressing member 46 turns in the direction of arrow D from its position indicated by the two-dot chain line to the position indicated by a full line in FIG. 9. With the cam 49 continuing to move further in the direction of arrow B, the pin 48 comes to the low lift face 49a of the slide cam 49 to bring the center core pressing member 46 back to the position indicated by the two-dot chain line. The pin 12 which is provided on the side face of the cassette holder 7 and the pin 17 which is provided on the side face of the stabilizer 44 are guided to move upward by the cam slots 13 and 18 provided in the slide plate 10. This causes the cassette holder 7 and the stabilizer 44 to move upward.

The cam follower pin 79 of the shutter opening member 73 comes to engage a low lift part of the cam 80 according as the cassette holder 7 ascends. At this instance, therefore, the shutter opening member 73 is caused by the urging force of the spring 78 to slide in the direction of arrow N shown in FIGS. 2 and 3. The closing claw 74a of the shutter closing member 74 plunges into the closing hole 71 of the shutter 70. Also, the opening claw 73a of the shutter opening member 73 plunges into the groove 66 of the cassette 2.

With the slide plates 10 and 10' sliding in the direction of arrow B in this manner, the center core pressing member 46 comes back to the initial position and, after that, the cassette holder 7 and the stabilizer 44 move upward back to their initial positions. Upon their return to the initial positions, the toothless part of the second toothless gear 27 confronts the gear 26 to disengage the second toothless gear 27 from the gear 26. The transmission of the driving torque to the gear 26 is thus cut off. Accordingly, the sliding motions of the slide plates 10 and 10' come to a stop.

The ascent of the cassette holder 7 causes the cassette pull-in and eject member 31 to move upward. The rack 29 again engages the gear unit 24. Since the gear unit 24 is rotating clockwise reversely to the direction taken at the time of descent of the cassette holder 7, the rack 29 is moved in the direction of arrow B.

As mentioned in the foregoing, the first toothless gear 25 remains engaged with the gear 22 even after the second toothless gear 27 disengages from the gear 26. Therefore, the gear 22 which is rotating clockwise causes the first and second toothless gears 25 and 27 and the lever 28 to rotate and turn counterclockwise. The toothless part of the first toothless gear 25 then comes to confront the gear 22 to disengage the gear 25 from the gear 22. The transmission of the driving force to the first toothless gear 25 is thus cut off. Then, a spring and a positioning member (not shown) bring the first and second toothless gears 25 and 27 and the lever 28 back to their initial positions shown in FIGS. 7A and 7B.

Since the loading motor 19 is still rotating, the gear unit 24 moves the rack 29 further in the direction of arrow B. The cassette pull-in and eject member 31 also slides in the direction of arrow B. When the cassette 2 is moved to a sufficient extent from the outside of the front panel of the recording and/or reproducing apparatus (not shown), the cassette ejection completion detecting switch SWU which is shown in FIGS. 11 and 12 is opened, and thereby the second flip-flop FF2 is then reset. Thus, the level of the Q output of the flip-flop FF2 becomes low. Therefore, the motor control circuit MCC brings the rotation of the loading motor 19 to a stop. The ejecting operation on the cassette 2 then comes to an end.

Under this condition, as mentioned in the foregoing, the closing claw 74a of the closing member 74 is in a state of having entered in the shutter closing hole 71 of the shutter 70 which is attached to the cassette 2. Therefore, with the cassette 2 taken out in the direction of arrow B as mentioned above, the shutter 70 is closed as the closing claw 74a moves the shutter 70 in the direction of arrow P relative to the cassette 2. With the shutter 70 closed, the recessed part 67a of the shutter lock member 67 comes to engage the engaging claw 72 of the shutter 70 to lock the shutter 70 in the closed state.

When the cassette 2 is moved further in the direction of arrow B, the shutter closing member 74 is guided to move in the direction of arrow G by the guide pin 76 which is located within the slot 74b as the closing claw 74a is abutting on the end face 71a of the shutter closing hole 71 of the shutter 70 as shown in FIG. 5C. At that point of time, the closing member 74 is caused to turn in the direction of arrow F against the urging force of the spring 77 as one end of the bent part 74e of the shutter opening member 73 comes from the end part 74d to the cam part 74c thereof. As a result, the closing claw 74a disengages from the shutter closing hole 71 and comes to ride on the side face of the shutter 70 (see FIG. 6B).

Under this condition, when the cassette 2 is moved still further in the direction of arrow B, the closing claw 74a enters into the groove 66 provided along one side of the cassette 2 and then comes away from the groove 66. The cassette 2 is thus taken out from the recording and/or reproducing apparatus.

Figure 13A:
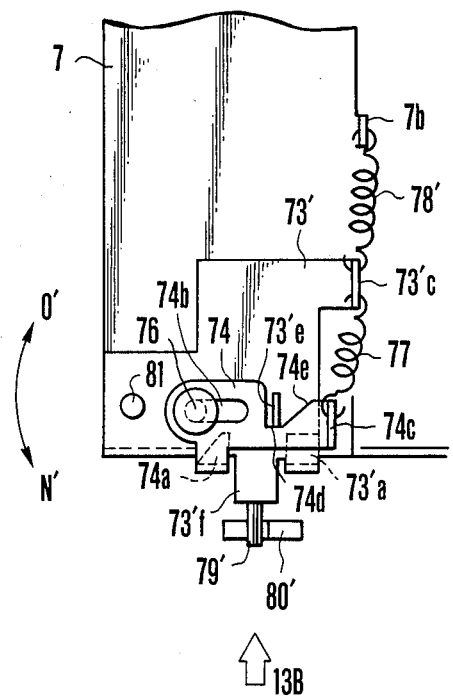
FIGS. 13A and 13B show the shutter operating mechanism of another embodiment of the present invention, FIG. 13A being a plan view and FIG. 13B a front view of the same.
Figure 13B:
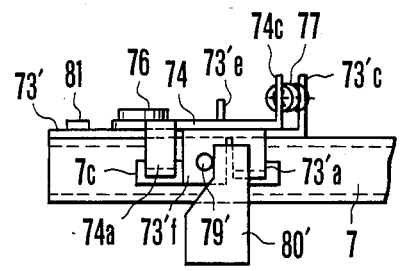

FIGS. 13A and 13B show the shutter opening and closing mechanism of another embodiment of this invention. In FIGS. 13A and 13B, the same reference numerals as those used in FIGS. 1–6 indicate the same components and parts and numerals with dashes indicate the parts performing the functions of corresponding parts shown in FIGS. 1–6.

Referring to FIGS. 13A and 13B, the shutter opening member 73', in this case, is turnably carried by a shaft 81 on the cassette holder 7. A spring 78' is arranged between the spring peg 73'c of the opening member 73' and the spring peg 7b of the cassette holder 7 to urge the member 73' to turn counterclockwise in the direction of arrow N' on the shaft 81. The opening member 73' is provided with a protuberant bent part 73'f which is arranged on the same side as the opening claw 73'a to adjoin thereto. A cam follower pin 79' is secured to the protuberant bent part 73'f. The pin 79' is abutting on a cam 80' under the force of the spring 78'. The cam 80' is fixedly arranged in the following manner: With the cassette holder 7 in the uplifted position, the turning movement in the direction of arrow N' of the opening member 73' caused by the force of the spring 78' causes the opening claw 73'a and the closing claw 74a of the shutter closing member 74 which is arranged in the same manner as in the preceding embodiment to be brought into engagement with the shutter 70 of the cassette 2. However, the cam lift of the cam 80' is arranged to disengage the opening and closing claws 73'a and 74'a from the shutter 70 and the cassette 2 when the cassette 2 comes to a stop or prior to that in the event of the descent of the cassette holder 7.

Therefore, in this embodiment, too, the shutter 70 is opened by the opening claw 73'a during the process of inserting the cassette 2 into the holder 7. Then, during the process of lowering the holder 7 after the inserting process, the opening and closing claws 73'a and 74a are moved away from the shutter 70 and the cassette 2, so that the cassette 2 can be prevented from being damaged by the over-stroke of the descent of the holder 7. When the holder 7 is uplifted for taking out the cassette 2 therefrom the closing claw 74a enters into the shutter closing hole 71 of the shutter 70 and the opening claw 73'a also enters into the groove 66 of the cassette with the holder 7 coming to the uplifted position. Then, the shutter 70 is closed during the process of taking out the cassette 2 from the holder 7 in the same manner as described in the foregoing.

In accordance with this invention, as described in detail in the foregoing, the recording and/or reproducing apparatus using a record bearing medium contained within a cassette having at least one opening part or aperture openably covered with a movable cover member is characterized in that: even when the cassette holding means is excessively moved relative to the cassette for the purpose of correctly setting the cassette in the loading position on the apparatus, the cassette can be adequately loaded without any possibility of damaging the cover member on the side of the cassette and the cover member operating means on the side of the apparatus. The invention is, therefore, highly advantageous for the apparatuses of the kind described.

While a specific embodiment of the invention has been shown and described in detail to illustrate the application of the inventive principles, it will be understood that the invention may be embodied otherwise without departing from such principles.

What is claimed is:

1. An apparatus for use with a record bearing medium housed in a cassette which is provided with at least one window for exposing a portion of the medium and a movable cover member for the window, a cassette loading device comprising:

(A) cassette holding means for receiving and holding the cassette, said holding means being movable between a first position to receive the cassette and a second position to place the cassette at a predetermined loading position;

(B) positioning means for positioning the cassette at said loading position when said holding means reaches a third position slightly before said second position during the movement of the holding means from said first position to said second position;

(C) opening and closing means movably provided on said holding means and selectively engageable with said movable cover member for engaging with said movable cover member when said holding means is at said first position thereby opening the window of the cassette in correspondence with an action to insert the cassette into the holding means and closing the window of the cassette in correspondence with an action to take out the cassette from the holding means; and (D) control means including a cam for controlling the engagement of said opening and closing means with said movable cover member so as to disengage said opening and closing means from said movable cover member before said holding means reaches said third position when the holding means is moved to said second position from said first position, and so as to engage said opening and closing means with said movable cover member after said holding means reaches said third position when the holding means is moved to said first position from said second position.

2. In an apparatus using a disc-shaped record bearing medium housed in a thin box-shaped cassette, said cassette being provided with first and second side parts parallel to each other, at least one window disposed near said first side part to expose a portion of the medium, and a cover member movable along said first side part to close and open said window, said cover member having a side part overlapping the first side part of the cassette, and the cassette being insertable into the apparatus along a predetermined first direction parallel to said side parts;

a cassette loading device comprising:

(A) holding means for receiving and holding the cassette, said holding means being movable between first and second positions along a predetermined second direction substantially perpendicular to said first direction and arranged to receive the cassette from said first direction at said first position and to place the cassette in a predetermined loading state at said second position;

(B) restriction means for restricting the cassette in said predetermined loading state when said holding means reaches a third position slightly before second position during the movement of the holding means from said first position to said second position;

(C) opening and closing means provided on said holding means, movable on said holding means along a predetermined third direction substantially perpendicular to said first and said second directions so that the opening and closing means is selectively engageable with said side part of said cover member, for engaging with the side part of the cover member when said holding means is at said first position thereby opening the window of the cassette in correspondence with an action to insert the cassette into the holding means along said first direction and closing the window of the cassette in correspondence with an action to take the cassette out from said holding means along said first direction; and (D) control means including a cam for controlling the engagement of said opening and closing means the side portion of said cover member in response to the movement of said holding means along said second direction so as to disengage said opening and closing means from said movable cover member before said holding means reaches said third position when the holding means is moved to said second position from said first position, and so as to engage said opening and closing means with said movable cover member after said holding means reaches said third position when the holding means is moved to said first position from said second position.

3. An apparatus using a disc-shaped magnetic record bearing medium housed in a thin box-shaped cassette, said cassette being provided with first and second side parts parallel to each other, at least one window disposed near said first side part to expose a portion of the medium, a cover member movable along said first side part to close and open said window, said cover member having a side part overlapping said first side part of the cassette, and the cassette being insertable into the apparatus along a predetermined first direction parallel to said side parts;

said apparatus comprising:

(A) a cassette holder for receiving and holding the cassette, said cassette holder being arranged to receive the cassette from said first direction and movable in a predetermined second direction substantially perpendicular to said first direction to place the cassette at a predetermined loading position, said holder being movable between a first position and a second position via a third position therebetween and is arranged to receive the cassette at said first position and to place the cassette at said loading position when it reaches said third position;

(B) positioning means engageable with the cassette to position the cassette at said loading position;

(C) opening and closing means for engaging with the side part of said cover member thereby opening the window in correspondence with an action to insert the cassette into said holder along said first direction and closing the window in correspondence with an action to take out the cassette out from said holder along said first direction;

(D) a magnetic head arranged to confront a recording surface of the medium through the opened window of the cassette when the cassette is placed at said loading position;

(E) rotating means for rotating the medium relative to said head, said rotating means being engageable with a portion of the medium when the cassette is placed at said loading position; and (F) control means including a cam for controlling the engagement of said opening and closing mean with the side part of said cover member, so as to disengage said opening and closing means from said cover member before said holder reaches said third position when the holder is moved to said second position from said first position, so as to engage said opening and closing means with said cover member after said holder reaches said third position when the holder is moved to said first position from said second position.

4. In an apparatus for use with a record bearing medium housed in a cassette which is provided with at least one window for exposing a portion of the medium and a movable cover member for the window, a cassette loading device comprising:

(A) cassette holding means for receiving and holding the cassette, said holding means being movable between a first position to receive the cassette and a second position to place the cassette at a predetermined loading position;

(B) opening and closing means engaging with said movable cover member for opening the window of the cassette in accordance with an action to insert the cassette into the holding means and closing the window of the cassette in accordance with an action to take out the cassette from the holding means; and (C) control means for bringing said opening and closing means into a state enabled to open and close said cover member by engaging said opening and closing means with said cover member in accordance with movement of said holding means between said first position and said second position and bring said opening and closing means into a departed state to disengage with said cover member.

5. The device according to claim 4, wherein said opening and closing means is movably provided on said holding means so that the opening and closing means is selectively engageable with said movable cover member.

6. A cassette loading device according to claim 4, wherein said control means brings said opening and closing means into a state engageable with said cover member when said holding means is at said first position so as to open said cover member by insertion of said cassette into said holding means, and brings said opening and closing means into a state unable to engage with said cover member when said holding means is at said second position.

7. The device according to claim 4, further comprising:

positioning means for positioning the cassette at said loading position when said holding means reaches a third position slightly before said second position during the movement of the holding means from said first position to said second positions.

8. A cassette loading device according to claim 7, wherein said opening and closing means is arranged to be movable with respect to said holding means, and said control means includes a cam which engages with said opening and closing means in accordance with the operation of said holding means so as to control said opening and closing means to engage and disengage with said cassette held in said holding means.

9. The device according to claim 7, wherein said control means is arranged to disengage said opening and closing means from said movable cover member before said holding means reaches said third position when the holding means is moved to said second position from said first position.

10. The deive according to claim 9, wherein said control means is arranged to engage said opening and closing means with said movable cover member after said holding means reaches said third position when the holding means is moved to said first position from said second position.

11. A cassette loading device according to claim 26 or claim 10, further comprising a head for recording on or reproducing from said record bearing medium, said head gaining access to said record bearing medium through said window of said cassette with its cover member being opened by said opening and closing means.

12. In an apparatus using a disc-shaped record bearing medium housed in a thin box-shaped cassette, said cassette being provided with first and second side parts parallel to each other, at least one window disposed near said first side part to expose a portion of the medium, and a cover member movable along said first side part to close and open said window, said cover member having a side part overlapping the first side part of the cassette, and the cassette being insertable into the apparatus along a predetermined first direction parallel to said side parts, a cassette loading device comprising:

(A) holding means for receiving and holding the cassette, said holding means being movable between a first position and a second position along a predetermined second direction substantially perpendicular to said first direction and arranged to receive the cassette from said first direction at said first position and to place the cassette in a predetermined loading state at said second position;

(B) opening and closing means provided on said holding means for engaging with the side part of the cover member when said holding means is at said first position thereby opening the window of the cassette in accordance with an action to insert the cassette into the holding means along said first direction and closing the window of the cassette in accordance with an action to take the cassette out of the holding means along said first direction; and (C) control means for bringing said opening and closing means into a state enabled to open and close said cover member by engaging said opening and closing means with said cover member in accordance with movement of said holding means between said first position and second position and bring said opening and closing means into a departed state to disengage with said cover member.

13. The device according to claim 12, wherein said opening and closing means is movable on said holding means along a predetermined third direction substantially perpendicular to said first and said second directions so that the opening and closing means is selectively engageable with the side part of the cover member, said control means being arranged to move said opening and closing means along said third direction.

14. The device according to claim 13, wherein said control means is arranged to disengage said opening and closing means from the cover member before said holding means reaches said second position when the holding means is moved to the second position from said first position.

15. The device according to claim 14, wherein said control means is arranged to engage said opening and closing means with the cover member before said holding means reaches said first position when the holding means is moved to the first position from said second position.

16. The device according to claim 15, wherein said control means includes a cam for controlling the engagement of said opening and closing means with the cover member.

17. The device according to claim 13, further comprising:

restriction means for restricting the cassette in said predetermined loading state when said holding means reaches a third position slightly before said second position during the movement of the holding means from said first position to said second positions.

18. The device according to claim 17, wherein said control means is arranged to disengage said opening and closing means from the cover member before said holding means reaches said third position when the holding means is moved to said second position from said first position.

19. The device according to claim 18, wherein said control means is arranged to engage said opening and closing means with the cover member after said holding means has reached said third position when the holding means is moved to said first position from said second position.

20. An apparatus using a disc-shaped magnetic record bearing medium housed in a thin box-shaped cassette, said cassette being provided with first and second side parts parallel to each other, at least one window disposed near said first side part to expose a portion of the medium, a cover member movable along said first side part to close and open said window, said cover member having a side part overlapping said first side part of the cassette, and the cassette being insertable into the apparatus along a predetermined first comprising:

(A) a cassette holder for receiving and holding the cassette, said cassette holder being arranged to receive the cassette from said first direction and movable in a predetermined second direction substantially perpendicular to said first direction to place the cassette at a predetermined loading position;

(B) positioning means engageable with the cassette to position the cassette at said loading position;

(C) opening and closing means for engaging with the side part of said cover member thereby opening the window in accordance with an action to insert the cassette into said holder along said first direction and closing the window in accordance with an action to take the cassette out of said holder along said first direction;

(D) a magnetic head for being arranged to confront a recording surface of the medium through the window of the cassette when the cassette is placed at said loading position;

(E) rotating means for rotating the medium relative to said magnetic head, said rotating means being engageable with a portion of the medium when the cassette is placed at said loading position; and (F) control means for maintaining said opening and closing means departed from said cover member while said cassette is positioned at said loading position by the movement of said cassette holder in said second direction.

21. The apparatus according to claim 20, wherein said holder is movable between a first position and a second position via a third position therebetween and is arranged to receive the cassette at said first position and to place the cassette at said loading position when it has reached said third position.

22. The apparatus according to claim 21, wherein said control means is arranged to disengage said opening and closing means from the cover member before said holder reaches said third position when the holder is moved to said second position from said first position.

23. The apparatus according to claim 22, wherein said control means is arranged to engage said opening and closing means with the cover member after said holder has reached said third position when the holder is moved to said first position from said second position.

* * * * *